(12) United States Patent
Efinger et al.

(10) Patent No.: US 8,562,220 B2
(45) Date of Patent: Oct. 22, 2013

(54) FLUID DYNAMIC BEARING SYSTEM

(75) Inventors: Wolfgang Efinger, Obereschach (DE); Matthias Bosnjak, Villingen-Schwenningen (DE)

(73) Assignee: Minebea Co., Ltd., Nagano-Ken (JP)

( * ) Notice: Subject to any disclaimer, the term of this patent is extended or adjusted under 35 U.S.C. 154(b) by 631 days.

(21) Appl. No.: 12/769,812

(22) Filed: Apr. 29, 2010

(65) Prior Publication Data
US 2010/0277831 A1 Nov. 4, 2010

(30) Foreign Application Priority Data
May 2, 2009 (DE) .......................... 10 2009 019 749

(51) Int. Cl.
*F16C 32/06* (2006.01)
*G11B 17/04* (2006.01)

(52) U.S. Cl.
USPC ........... 384/110; 384/100; 384/107; 384/119; 384/124

(58) Field of Classification Search
USPC ................. 384/100, 107, 110, 119, 124, 132; 360/90, 99.08, 99.07
See application file for complete search history.

(56) References Cited

U.S. PATENT DOCUMENTS

| | | | | |
|---|---|---|---|---|
| 5,947,608 A | * | 9/1999 | Kim | 384/110 |
| 6,154,339 A | * | 11/2000 | Grantz et al. | 360/99.08 |
| 6,280,088 B1 | * | 8/2001 | Leuthold et al. | 384/110 |
| 6,322,252 B1 | * | 11/2001 | Grantz et al. | 384/124 |
| 6,439,774 B1 | * | 8/2002 | Knepper et al. | 384/110 |
| 6,672,766 B2 | * | 1/2004 | Nottingham et al. | 384/110 |
| 6,702,465 B2 | * | 3/2004 | Grantz et al. | 384/110 |
| 6,731,456 B2 | | 5/2004 | Parsoneault | |
| 6,814,492 B2 | | 11/2004 | Beckers | |
| 6,955,471 B2 | * | 10/2005 | Heine et al. | 384/110 |
| 7,131,770 B2 | | 11/2006 | Neumann | |
| 7,226,212 B2 | * | 6/2007 | Neumann | 384/119 |

FOREIGN PATENT DOCUMENTS

| | | | |
|---|---|---|---|
| DE | 102008025618 A1 | * | 12/2009 |
| JP | 2001027226 A | * | 1/2001 |
| JP | 2003269445 A | * | 9/2003 |
| JP | 2005 337295 | | 12/2005 |
| JP | 2006 353058 | | 12/2006 |

* cited by examiner

*Primary Examiner* — Marcus Charles
(74) *Attorney, Agent, or Firm* — Cooper & Dunham LLP

(57) ABSTRACT

A fluid dynamic bearing system having a first conical bearing and a second conical bearing working in opposition to the first conical bearing, wherein the two conical bearings are disposed along a stationary shaft, wherein the first and the second conical bearing each comprises a bearing cone disposed on the shaft having bearing surfaces as well as a conical counter bearing disposed in a rotor component that are separated from one another by a bearing gap filled with a bearing fluid, wherein the bearing gap has a first open end that is sealed by a first sealing gap partially filled with bearing fluid, wherein the bearing fluid in the sealing gap forms a fluid meniscus. The sealing gap is bounded by sealing surfaces of the bearing cone and associated sealing surfaces of the rotor component, wherein the smallest radius R1 of the sealing surfaces of the rotor component is larger than the largest outer radius R2 of the bearing cone and larger than the greatest possible distance R3 of the fluid meniscus from the rotational axis.

17 Claims, 3 Drawing Sheets

FLUID DYNAMIC BEARING SYSTEM

BACKGROUND OF THE INVENTION

The invention relates to a fluid dynamic bearing system, particularly a fluid dynamic bearing system having conical bearings that may be used in particular for the rotatable support of a spindle motor. Spindle motors having these kinds of fluid dynamic bearings are used, for example, for driving hard disk drives or fans.

PRIOR ART

US 2004/0005101 A1 discloses a fluid dynamic bearing system having two conical bearings working in opposition to each other. Each conical bearing has a bearing cone disposed on a stationary shaft that interacts with a counter bearing that is disposed in a rotor component. The bearing surfaces of each conical bearing are separated from one another by an individual bearing gap filled with a bearing fluid. The bearing gaps of the two conical bearings each have two open ends, each open end being sealed by a tapered sealing gap partially filled with bearing fluid. The inner sealing gaps facing the other conical bearing are bounded by the shaft and the hub. The outer sealing gaps are bounded by a surface of the bearing cone and a covering cap that seals the bearing at this end and is fixed to the rotor component. The covering cap thus forms a part of the sealing gap that bounds the bearing and has to be mounted in its final position before the bearing fluid can be filled into the bearing gap of the bearing. The bearing fluid is filled into the sealing gap through an opening in the covering cap and reaches the bearing gap through the use of capillary forces. This filling method gives rise to the problem that after filling, the filling level, i.e. the level of the fluid column within the sealing gap, cannot be detected since the covering cap makes it impossible to see into the bearing gap. This means that a measured amount of fluid has to be filled into the bearing with the assumption that this filling level corresponds exactly to the filling level required. However, since the bearings are subject to geometric dimensional deviations, it may occur that not enough bearing fluid is filled into some bearings and too much is filled into others. Moreover, the covering cap prevents any optical inspection of the filling level of the bearing fluid and can no longer be removed after the bearing has been filled, since it forms part of the sealing gap.

SUMMARY OF THE INVENTION

The object of the invention is to provide a fluid dynamic bearing having the type of construction as described at the outset which can be easily filled and that allows the filling level to be optically detected after filling.

This object has been achieved according to the invention by a fluid dynamic bearing having the characteristics of claim 1.

Preferred embodiments of the invention and advantageous characteristics are cited in the subordinate claims.

According to the invention, the sealing gap is no longer bounded by a covering cap but rather by sealing surfaces of the bearing cone and associated sealing surfaces of the rotor component. Here, the smallest radius of the sealing surfaces of the rotor component is larger than the largest outer radius of the bearing cone and also larger than the greatest distance of the fluid meniscus from the rotational axis. This makes it possible to fill the bearing and inspect the filling level before the covering cap is mounted.

Thus according to the invention, a dual conical bearing is provided where each conical bearing has a sealing gap taking the form of a capillary seal that is formed between the outside surface of the bearing cone and an adjacent inside surface of the rotor component. The cross-section of the sealing gap is tapered, starting from the bearing gap and widening towards the bearing opening. Designing the sealing gap in this way makes it possible, when assembling the bearing, to first fill bearing fluid into the bearing gap, to then measure the correct filling level of the bearing fluid by inspecting the sealing gap and only then to mount a covering cap to cover the bearing. The covering cap no longer forms part of the sealing gap and only performs a protective function to protect the hard disks from contamination through any possible leakage of bearing fluid.

Alongside the advantage of easier filling and filling level control, the invention has some other advantages. For one thing, the design of the covering cap can be made much simpler and more cost-effective and does not require a filling aperture for the oil. In addition, the connection of the covering cap to the rotor component need not be made leak-proof as was necessary when the covering cap formed a part of the sealing gap. This means that the connection to the rotor component does not need an oil or helium-tight weld or seal when the covering cap is mounted. Furthermore, there is no longer any need to inspect the tightness of the connection of the covering cap to the rotor component nor to inspect the welded joint or bonded joint for the covering cap. Basically, it is not essential to provide a covering cap, and in the bearing according to the invention it may be omitted since it effectively no longer performs an important function.

In a preferred embodiment of the invention, the sealing surfaces of the rotor component are at least partly formed by an annular rim that forms a part of the rotor component. The smallest radius R1 of the sealing surfaces of the rotor component is disposed in the region of the rim. To allow the bearing cone to be mounted in the rotor component, the largest radius R2 of the bearing cone has to be smaller than the smallest radius R1 of the sealing surfaces of the rotor component.

The sealing surfaces of the rotor component as well as the sealing surfaces of the bearing cone are preferably inclined at an angle $\alpha$ or $\beta$ respectively to the rotational axis of the bearing. The angle of inclination $\alpha$ of the bearing surface of the rotor component is thereby preferably smaller than the angle of inclination $\beta$ of the sealing surface of the bearing cone, where preferably $0°<\alpha<\beta$ applies. Here, all angles are measured with respect to the rotational axis. For example, angle $\alpha$ lies in a range of 1° to 4° with respect to the rotational axis and angle $\beta$ lies in a range between 5° to 15°. Alongside the capillary effect for retaining the bearing fluid in the sealing gap, this inclination of the sealing surfaces of the bearing takes additional advantage of the centrifugal effect on rotation of the bearing about the rotational axis. Due to the centrifugal effect, the bearing fluid is forced outwards onto the sealing surface of the rotor component and due to the inclined sealing surface it is forced in the direction of the interior of the bearing, thus additionally preventing any leakage of bearing fluid out of the fluid bearing.

The bearing cone is covered by an annular covering cap that is disposed on the rotor component at a spacing to the bearing cone and encloses the shaft while forming an annular air gap. The covering cap is preferably fixed to the rim formed integrally with the hub using such means as welding, bonding, pressfitting or a combination of the above methods. In a preferred embodiment of the invention the covering cap may even be snapped into the rim of the rotor component using a snap-in connection. For this purpose, the rim has an undercut into which a bulge on the covering cap engages.

In the space between the covering cap and the surfaces of the bearing cone there is usually no bearing fluid. The fluid meniscus of the column of bearing fluid is located within the sealing gap that extends substantially in an axial direction. The covering cap, together with the shaft, does, however, form a gap seal for retaining any bearing fluid that may leak out of the bearing gap. But this is only to be expected if the bearing is subjected to an inadmissibly high shock effect. To allow the filling level of the bearing fluid to be measured, the largest expected distance R3 between the rotational axis and the fluid meniscus within the capillary seal must at all events be smaller than the distance R1.

Since a bearing that is open at two ends is involved here, it is important for the openings of the bearing gap ending in the interior of the bearing to be vented, so as to maintain both ends of the bearing gap at atmospheric pressure. For this purpose it is preferable if a central hole is provided in the shaft, the central hole being connected to the outside atmosphere. Using appropriate transversal holes, the sealing gaps ending in the interior of the bearing system between the upper and the lower bearing cone are now vented.

To enable circulation of bearing fluid in the bearing gap, a recirculation channel is preferably disposed in the bearing cone, the recirculation channel connecting the first sealing gap directly to the second sealing gap. Through the pumping effect of the bearing grooves on the bearing surfaces, the bearing fluid in the bearing gap is pumped in the direction of the second sealing gap and flows through the recirculation channel back to the first sealing gap. The second sealing gap in the interior of the bearing is bounded by sealing surfaces of the bearing cone and associated sealing surfaces of the rotor component. It is formed by a tapered capillary seal and additionally by a pumping seal that is disposed between the capillary seal and the actual bearing gap. The pumping seal has spiral-shaped grooves that pump into the interior of the bearing and also acts in particular as a radial bearing.

The invention also relates to a spindle motor having a stator, a rotor, an electromagnetic drive system and a fluid dynamic bearing system according to the invention for the rotatable support of the rotor with respect to the stator.

A disk drive having this kind of spindle motor that has at least one storage disk driven by the spindle motor and means for reading and/or writing data off and to the storage disk is also claimed.

A preferred embodiment of the invention is described in more detail below on the basis of the drawings. Further advantages and characteristics of the invention can be derived from this.

DESCRIPTION OF PREFERRED EMBODIMENTS OF THE INVENTION

Figure 1:
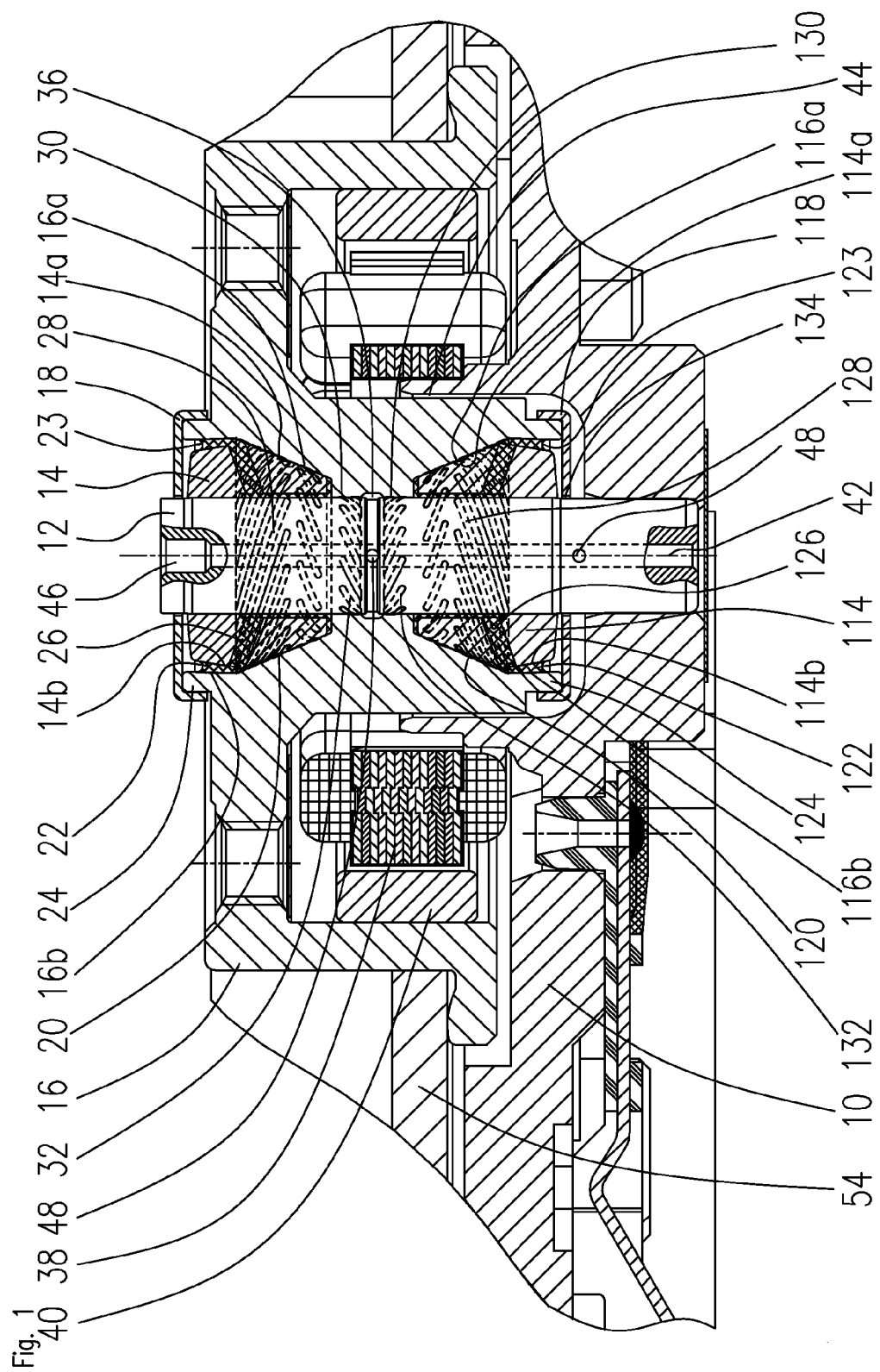
FIG. 1: shows a section through a spindle motor having a fluid dynamic bearing system according to the invention

FIG. 1 shows a section through a spindle motor having a fluid dynamic bearing system according to the invention. The spindle motor comprises a baseplate 10 having a bore in which a shaft 12 is fixedly accommodated. The bearing system takes the form of a conical bearing system having two bearing components working in opposition to each other and having conical bearing surfaces. Two bearing cones 14, 114 are disposed on the shaft 12 at an axial distance from one another. The upper free end of the shaft 12 may be connected to a stationary component (not illustrated), which could, for example, be a housing component.

Each bearing cone 14, 114 has an annular bearing surface 14a, 114a set at an inclination to the rotational axis 42. A further bearing component taking the form of a rotor component 16 is disposed rotatable about the rotational axis 42 with respect to the bearing cones 14, 114. The rotor component 16 also has annular bearing surfaces 16a, 116a set at an inclination to the rotational axis 42 that lie opposite the respective bearing surfaces 14a, 114a of the bearing cones 14, 114. When the bearing is being assembled, the lower bearing cone 114, for example, is mounted on the shaft 12, the rotor component 16 is then put over the shaft 12 and finally the upper bearing cone 14 is mounted on the shaft 12 at a predetermined axial spacing. Assembly is carried out in such a way that the mutually opposing bearing surfaces 14a, 16a or 114a, 116a of the bearing cones 14, 114 and of the rotor component 16 are separated from one another by a bearing gap 20, 120. The bearing gaps 20, 120 have, for example, a width of only a few micrometers. The bearing gaps 20, 120 are filled with a bearing fluid, such as a bearing oil. The bearing surfaces of the bearing cones 14, 114 or the bearing surfaces of the rotor component 16 have familiar grooved patterns, which, on rotation of the rotor component 16 with respect to the bearing cones 14, 114, exert a pumping effect on the bearing fluid found in the respective bearing gap 20, 120. This goes to build up fluid dynamic pressure in the bearing gap 20, 120 which gives the bearing its load-carrying capacity. The two cone-shaped fluid bearings work in opposition to each other in that they pump the bearing fluid in the direction of the respective associated pumping seal 32, 132, so that the bearing system as a whole remains in equilibrium. Both cone-shaped fluid bearings have herringbone-shaped bearing grooves 28, 128 that have a longer branch that is disposed adjacent to the sealing gap 22, 122 as well as a shorter branch that is disposed adjacent to the pumping seal 32, 132. The stronger pumping effect of the longer branch of the bearing grooves of the conical bearing results in an overall pumping effect that is directed towards the interior of the bearing. Due to their tapered design, the bearing cones 14, 114 act equally as both radial and axial bearings.

The bearing gaps 20, 120 are not connected to one another but rather have two open ends. The respective outer end of the bearing gaps 20, 120 ends in the direction of the two ends of the shaft 12, whereas the inner end of the bearing gaps 20, 120 ends within the bearing in a space 36 that is disposed between the two bearing cones 14, 114, the shaft 12 and the rotor component 16.

The two ends of the bearing gaps 20, 120 are sealed by seals, preferably capillary seals taking the form of sealing gaps 22, 122 and 30, 130. The second sealing gaps 30, 130 moreover have a pumping seal acting in the direction of the respective bearing cone 14, 114. The sealing gaps are partially filled with bearing fluid. The outer, first sealing gaps 22, 122 are bounded by a sealing surface of the bearing cones 14b, 114b as well as an opposing sealing surface 16b, 116b of the rotor component 16. According to the invention, the rotor component 16 has in both sealing regions a raised rim 24, 124 that at least partly forms the sealing surfaces 16b, 116b.

Figure 2:
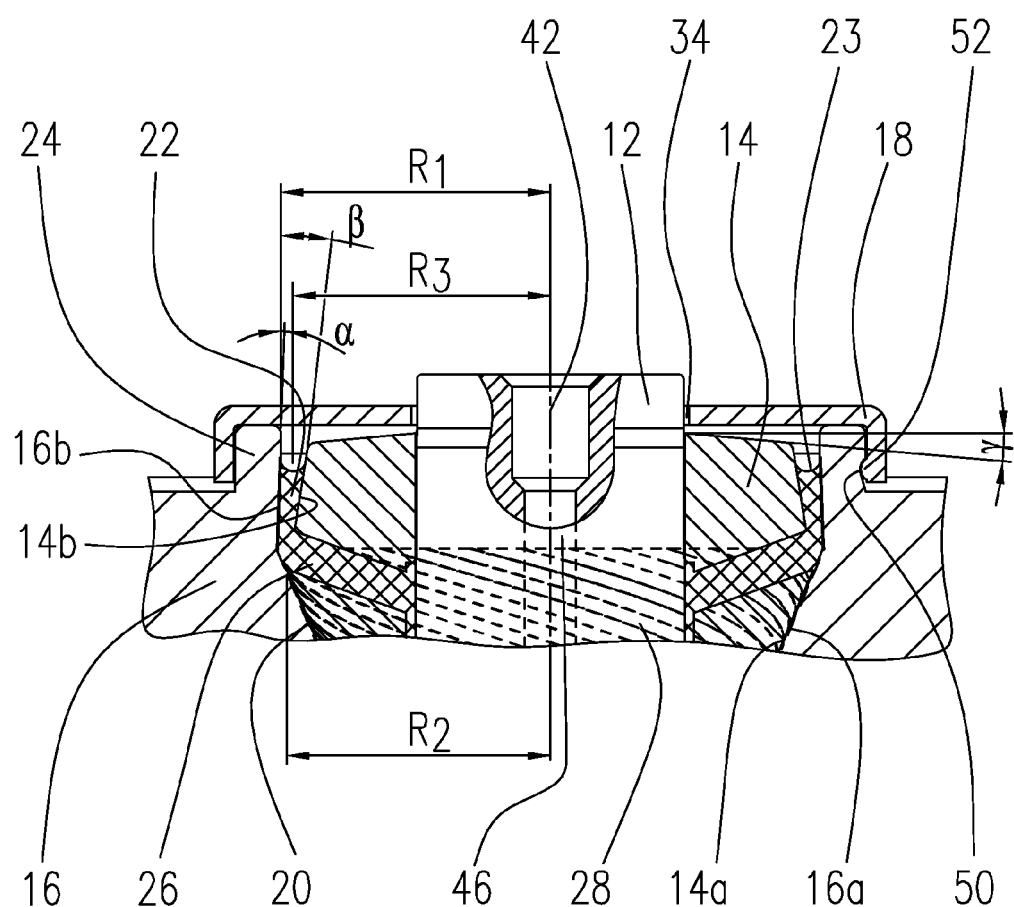
FIG. 2: shows a section through an enlarged view of a part of the bearing system in the region of the sealing gap

FIG. 2 shows an enlarged view of the sealing region of the upper bearing. The sealing region of the lower bearing is identical in design and thus not illustrated.

Both the sealing surface 14b of the bearing cone 14 as well as the sealing surface 16b of the rotor component 16, which is formed partly by the rim 24, are not aligned parallel to the rotational axis 42, but rather extend at an angle α or β with respect to the rotational axis 42. This inclination of the sealing surfaces 14b, 16b takes advantage of the centrifugal force acting on the bearing fluid on rotation of the bearing. The inclination divides the radially outwards acting centrifugal force into a radial and an axial component, the axial component helping to force the bearing fluid from the sealing gap 22 back into the bearing gap 20. The angle of inclination β of the sealing surface 14b of the bearing cone 14 is preferably larger than the angle of inclination α of the sealing surface 16b of the rotor component 16. Whereas α lies, for example, between 1° and 4°, β lies, for example, between 5° and 15°.

The value R1 represents the smallest distance between the rotational axis 42 and the inside wall of the rotor component 16 in the region of the sealing gap 22, thus above the actual bearing region that is marked by bearing grooves 28. The distance R2 represents the radius of the bearing cone 14 at the point of its greatest radial expansion. Finally, value R3 represents the largest possible distance between the rotational axis 42 and a fluid meniscus 23 within the capillary seal 22. According to the invention, R1>R2 and R1>R3 now applies. R1>R2 makes it possible for the bearing cone 14 to be mounted within the rotor component 16, i.e. the outside circumference of the bearing cone 14 does not strike against the narrowest point of the sealing surface 16b of the rotor component 16. The requirement R1>R3 indicates that the filling level of the bearing fluid in the sealing gap 22, in particular the fluid meniscus 23, is visible from the outside and thus the filling level can be detected if one were to look into the sealing gap 22 parallel to the rotational axis 42. The edge of the rotor component having the smallest radius R1 must not hide the meniscus 23 having radius R3 when the sealing gap 22 contains the lowest permissible filling level of bearing fluid. Thus R1 must never be smaller than R3, so that the filling level is visible at all times.

The angle γ in FIG. 2 represents the inclination of the upper end face of the bearing cone 14 relative to the horizontal, i.e. relative to the normal to the rotational axis 42. By changing the inclination of the end face of the bearing cone 14 at an angle γ, the size of the space between the bearing cone 14 and the cover 18 can be changed.

Alongside the illustrated variant, a possible alternative is for the bearing gap to grow continuously larger in a radial direction as well, starting from the substantially axial capillary seal and extending between the bearing cone 14, 114 and the cover 18, 118.

The sealing regions 22 or 122 or the two bearing cones 14, 114 are covered by a covering cap 18, 118. The covering caps protect the bearing region against any ingress of dirt. They also ensure that, in the unlikely case of bearing fluid leaking out of the sealing region 22, 122, this bearing fluid cannot leave the bearing. For this purpose, the covering cap 18 or 118 forms a gap seal 34, 134 with the outside circumference of the shaft 12. The covering cap 18, 118 can be placed on the rim 24, 124 of the rotor component 16 and affixed using (laser) welding, bonding, pressfitting or any combination of the above methods. As can be seen from FIG. 2, the rim 24 of the rotor component 16 at the outside circumference may have an undercut 50 into which a circumferential bulge 52 on the covering cap 18 engages and holds the covering cap on the rim 24. The space between the covering cap 18, 118 and the bearing cone 14, 114 is generally free of bearing fluid.

To ensure the circulation of bearing fluid in the bearing gaps 20, 120, recirculation channels 26, 126 are disposed in the bearing cones 14, 114. By means of the bearing grooves 28, 128, bearing fluid is conveyed in the bearing gap 20 from the sealing gap 22 in the direction of the inner second sealing gaps 30, 130. Via the recirculation channels 26, 126, this bearing fluid can again recirculate to the first sealing region 22, 122. In the region of the second sealing gaps 30, 130, pumping seals 32, 132 may be additionally provided. The pumping seals 30, 32 are marked by grooved patterns that are disposed on the shaft 12 or on the rotor component 16. On rotation of the rotor component 16, these grooved patterns generate a pumping effect on the bearing fluid in the direction of the interior of the bearing, in other words in the direction of the bearing gap 20 or 120.

The rotor component 16 is driven in rotation with respect to the stationary motor components using an electromagnetic drive system. The drive system consists of an annular stator arrangement 38 having a plurality of phase windings that is fixed to the baseplate 10. The stator arrangement 38 is disposed within a recess of the rotor component 16 and lies directly opposite a rotor magnet 40. The rotor magnet 40 is disposed at an inner rim of the rotor component 16 and is separated by an air gap from the stator arrangement 38. When the phase windings of the stator arrangement 38 are appropriately energized, an alternating electromagnetic field is generated that acts on the rotor magnet 50 and sets the rotor 16 in rotation.

In the case of the illustrated bearing system having two separate conical bearings and respective bearing gaps 20, 120 having two open ends, it is important that the openings of the bearing gap 20, 120 or the sealing regions 30, 130 ending in the interior of the bearing be vented, so that atmospheric pressure prevails at the boundary between the bearing fluid found in the bearing gap and the surrounding air. Venting the interior of the bearing is preferably achieved using a hole 46 disposed in the shaft that is connected via a transversal hole 48 (see FIG. 1) to the space 36 in the interior of the bearing. The same atmospheric pressure then prevails in the space 36 as is found on the outside of the bearing.

The sealing gap 122 of the lower conical bearing is vented either via another transversal hole 48 or via a gap 44 between the rotor component and a rim of the baseplate 10.

Figure 3:
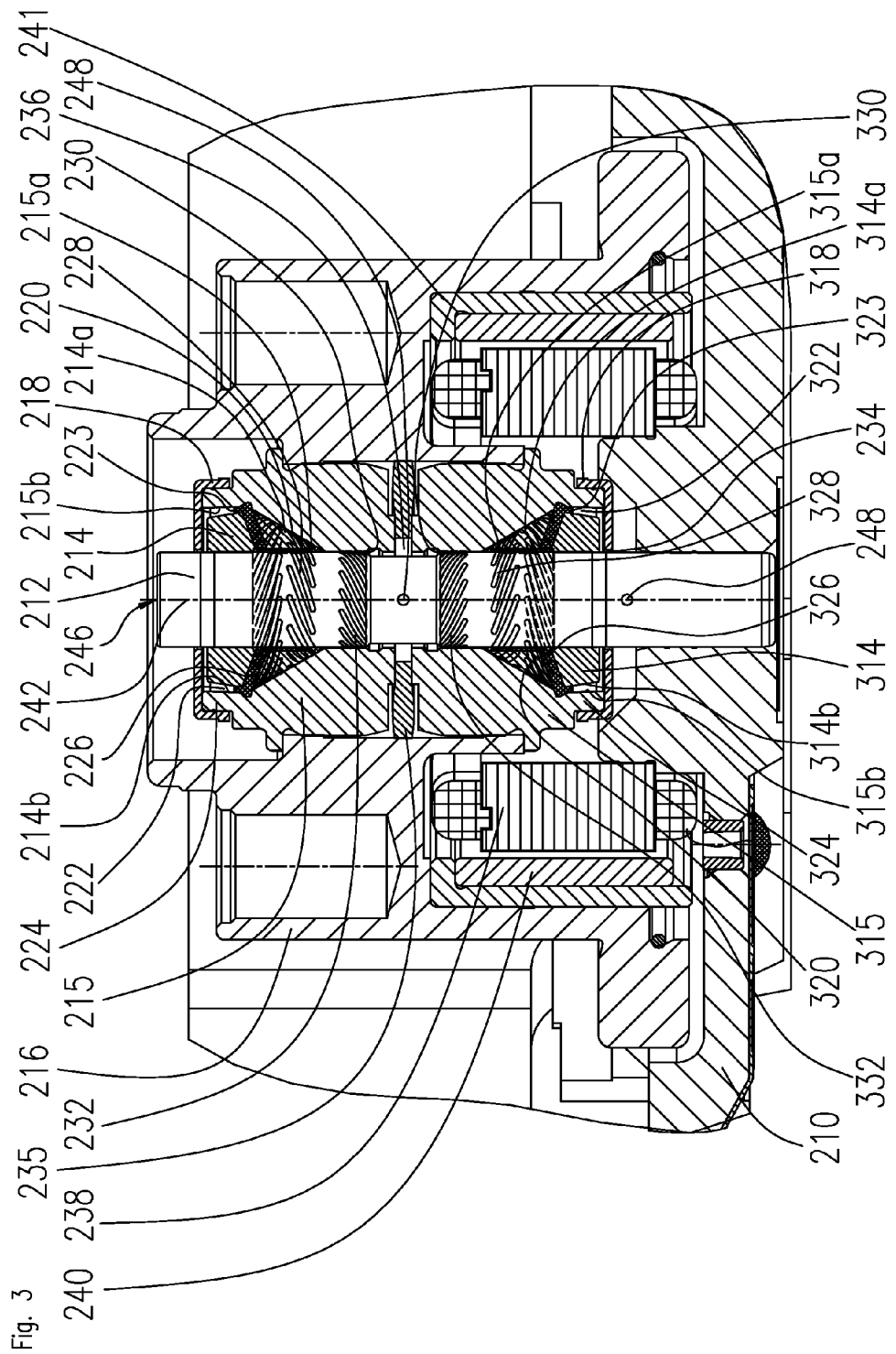
FIG. 3: shows a section through a spindle motor having a modified embodiment of a fluid dynamic bearing system.

FIG. 3 shows a section through a spindle motor having a slightly modified embodiment of a fluid dynamic bearing system according to the invention compared to FIG. 1. The spindle motor according to FIG. 3 corresponds in its basic design and construction to the spindle motor according to FIG. 1, where components having identical or similar functions are indicated by the same reference numbers.

The spindle motor comprises a shaft 212 disposed in a baseplate 210 on which two bearing cones 214, 314 are disposed at a mutual distance from one another. Each bearing cone 214, 314 has an annular bearing surface 214a, 314a set at an inclination to the rotational axis 242. The corresponding counter bearing to the bearing cones is formed by two bearing components taking the form of bearing bushes 215, 315 that also have annular bearing surfaces 215a, 315a set at an inclination to the rotational axis 242. The bearing surfaces 215a, 315a of the bearing bushes 215, 315 lie opposite the bearing surfaces 214a, 314a of the bearing cones 214, 314, the bearing surfaces being separated from one another by a bearing gap 220, 320. The bearing gaps 220, 320 are filled with a bearing fluid, such as a bearing oil. The bearing surfaces of the bearing cones 214, 314 or the bearing surfaces of the bearing bushes 215, 315 have familiar grooved bearing patterns that, on rotation of the bearing bushes 215, 315 with respect to the bearing cones 214, 314, generate hydrodynamic pressure in the bearing gap 220, 320, thus giving the bearing its load-carrying capacity. The functioning and embodiment of the fluid dynamic bearing have already been described in conjunction with FIGS. 1 and 2 and also apply here accordingly.

The bearing gaps 220, 320 are not connected to one another but rather have two open ends each being sealed by appropriate sealing means. The seals are preferably designed as capillary seals taking the form of sealing gaps 222, 322 and 230, 330. Pumping seals 232, 332 are preferably associated with the sealing gaps 230, 330, the pumping seals 232, 332 being formed by grooved patterns. The upper seal 222 is bounded by a first sealing surface 214b of the bearing cone 214 and an opposing sealing surface 215b of the bearing bush 215. The lower seal 122 is correspondingly bounded by the first sealing surface 314b of the bearing cone 314 and a second sealing surface 315b of the bearing bush 315.

The upper sealing regions of the two fluid dynamic bearing systems, i.e. the regions around the first sealing gap 222 or 322, are designed in an identical way to those described in conjunction with FIG. 2. The description of FIG. 2 applies here accordingly.

The respective covering caps 218 or 318 for covering the sealing gaps 222, 322 are placed over and affixed to a rim 224, 324 of the bearing bushes 215, 315. For this purpose, a snap-in fastener may also be provided as shown in FIG. 2 with reference to the reference numbers 50, 52.

The two bearing bushes 215, 315a are disposed in a recess in a rotor component 216 and fixedly connected to the rotor component 216. Thus, two separate fluid dynamic conical bearing systems are formed that operate independently of each other. The two bearing bushes 215, 315 are separated from one another and spaced apart by a distance plate 235. A remaining space 236 is used for venting the respective openings or seal openings of the bearings.

The electromagnetic drive system of the motor comprises a stator arrangement 238 that is disposed on the baseplate 210. The rotor component 216 carries a rotor magnet 240 that is enclosed by a back yoke ring 241 that closes the magnetic circuit.

The bearing system according to FIG. 3 has the advantage over FIG. 1 that the individual bearing components, particularly the bearing cones 214, 314 and bearing bushes 215, 315, are provided separately and are therefore easier to machine compared to the single-piece rotor component 216 in FIG. 1. It is also easier to pair the bearing cones 214, 314 and bearing bushes 215, 315 than to pair the rotor component 216 and the bearing cones 214, 314.

IDENTIFICATION REFERENCE LIST 10, 210 Baseplate
12, 212 Shaft
14, 214 Bearing cone
14a, 214a Bearing surface
14b, 214b Sealing surface
215 Bearing bush (FIG. 3)
215a Bearing surface (FIG. 3)
215b Sealing surface (FIG. 3)
16, 216 Rotor component
16a, 216a Bearing surface
16b, 216b Sealing surface
18, 218 Covering cap
20, 220 Bearing gap
22, 222 First sealing gap
23, 223 Fluid meniscus
24, 224 Rim
26, 226 Recirculation channel
28, 228 Bearing grooves
30, 230 Second sealing gap
32, 232 Pumping seal
34 Gap seal
235 Distance plate (FIG. 3)
36, 236 Space
38, 238 Stator arrangement
40, 240 Rotor magnet
241 Back yoke ring (FIG. 3)
42, 242 Rotational axis
44 Gap
46, 246 Hole (shaft)
48, 248 Transversal hole
50 Undercut (rim)
52 Bulge (covering cap)
54 Storage disk
114, 314 Bearing cone
114a, 314a Bearing surface
114b, 314b Sealing surface
315 Bearing bush (FIG. 3)
315a Bearing surface (FIG. 3)
315b Sealing surface (FIG. 3)
116a, 316a Bearing surface
116b, 316b Sealing surface
118, 318 Covering cap
120, 320 Bearing gap
122, 322 First sealing gap
123, 323 Fluid meniscus
124, 324 Rim
126, 326 Recirculation channel
128, 328 Bearing grooves
130, 330 Second sealing gap
132, 332 Pumping seal
134, 334 Gap seal
R1 Smallest radius of the sealing surfaces of the rotor component
R2 Largest radius of the bearing cone
R3 Largest distance of the fluid meniscus from the rotational axis
α Angle of inclination (sealing surface)
β Angle of inclination (sealing surface)
γ Angle (bearing cone)

The invention claimed is:

1. A fluid dynamic bearing system having a first conical bearing and a second conical bearing working in opposition to the first conical bearing, wherein the two conical bearings are disposed along a stationary shaft (12, 212),
wherein the first and the second conical bearing each has:
a bearing cone (14; 114; 214; 314) disposed on the shaft having bearing surfaces (14a; 114a; 214a; 314a);
a bearing component (215; 315; 16) having an annular rim (24; 124; 224; 324) that forms a conical counter bearing having bearing surfaces (215a; 315a; 16a, 116a); a bearing gap (20; 120; 220; 320) filled with a bearing fluid that separates the bearing surfaces of the bearing cone and the bearing surfaces of the bearing component from one another; a first open end of the bearing gap (20; 120; 220; 320), a first sealing gap (22; 122; 222; 322) that is partially filled with bearing fluid and seals the first open end of the bearing gap, wherein the bearing fluid in the first sealing gap (22; 122; 222; 322) forms a fluid meniscus (23; 123; 223; 323),
characterized in that the first sealing gap (22; 122; 222; 322) is bounded by sealing surfaces (14b; 144b; 214b; 314b) of the bearing cone (14; 114; 214; 314) and associated sealing surfaces (215b; 315b; 16b; 116b) of the bearing component (215, 315; 16), wherein the smallest radius R1 of the sealing surfaces (215b; 315b; 16b; 116b) of the bearing component (215; 315; 16) is larger than the largest outer radius R2 of the bearing cone (14; 114; 214; 314) and larger than the greatest distance R3 of the fluid meniscus (23; 123; 223; 323) from the rotational axis (42; 242).

2. A fluid dynamic bearing system according to claim 1, characterized in that the sealing surfaces (215*b*; 315*b*; 16*b*; 116*b*) of the bearing component (215; 315; 16) are partially formed by the annular rim (24; 124; 224; 324), the smallest radius R1 of the sealing surfaces (215*b*; 315*b*; 16*b*; 116*b*) of the bearing component (215; 315; 16) being disposed in the region of the rim (24; 124; 224; 324).

3. A fluid dynamic bearing system according to claim 1, characterized in that the largest outer radius R2 of the bearing cone (14; 114; 214; 314) is disposed in the transition region between its bearing surfaces (14*a*; 114*a*; 214*a*; 314*a*) and sealing surfaces (14*b*; 144*b*; 214*b*; 314*b*).

4. A fluid dynamic bearing system according to claim 1, characterized in that the sealing surfaces (215*b*; 315*b*; 16*b*; 116*b*) of the bearing component (215; 315; 16) are inclined at least in the region of the rim (24; 124; 224; 324) at an angle α in the direction of the rotational axis (42; 242).

5. A fluid dynamic bearing system according to claim 4, characterized in that the sealing surfaces (14*b*; 114*b*; 214*b*; 314*b*) of the bearing cone (14; 114; 214; 314) are inclined at an angle β in the direction of the rotational axis (42; 242).

6. A fluid dynamic bearing system according to claim 5, characterized in that for angle α and β $0° < α < β$ applies.

7. A fluid dynamic bearing system according to claim 1, characterized in that the bearing cone (14; 114; 214; 314) is covered by an annular covering cap (18; 118; 218; 318) that is disposed on the bearing component (215; 315; 16) at a distance to the bearing cone (14; 114; 214; 314) and encloses the shaft (12; 212) while forming an annular air gap.

8. A fluid dynamic bearing system according to claim 7, characterized in that the covering cap (18; 118; 218; 318), together with the shaft (12; 212), forms a gap seal (34; 134).

9. A fluid dynamic bearing system according to claim 7, characterized in that the covering cap (18; 118; 218; 318) is placed over and affixed on the rim (24; 124; 224; 324) of the bearing component (215; 315; 16).

10. A fluid dynamic bearing system according to claim 7, characterized in that the rim (24) has an undercut (50) into which a circumferential bulge (52) on the covering cap (18) engages.

11. A fluid dynamic bearing system according to claim 1, characterized in that the bearing gap (20; 120; 220; 320) has a second open end that is sealed by a second sealing gap (30; 130; 230; 330).

12. A fluid dynamic bearing system according to claim 11, characterized in that the second sealing gap (30; 130; 230; 330) is bounded by sealing surfaces of the bearing cone (14; 114; 214; 314) and associated sealing surfaces of the bearing component (215; 315; 16).

13. A fluid dynamic bearing system according to claim 1, characterized in that a central hole (46; 246) is disposed in the shaft (12; 212) that is connected to the outside atmosphere, wherein the second sealing gaps (30; 130; 230; 330) that end in the interior of the bearing system are vented by transversal holes (48; 248).

14. A fluid dynamic bearing system according to claim 1, characterized in that a recirculation channel (26; 126; 226; 326) is disposed in the bearing cone (14; 114; 214; 314), the recirculation channel (26; 126; 226; 326) connecting the first sealing gap (22; 122; 222; 322) directly to the second sealing gap (30; 130; 230; 330).

15. A fluid dynamic bearing system according to claim 1, characterized in that the first conical bearing is formed symmetric to the second conical bearing.

16. A spindle motor having a stator, a rotor, an electromagnetic drive system and a fluid dynamic bearing system having a first conical bearing and a second conical bearing working in opposition to the first conical bearing, wherein the two conical bearings are disposed along a stationary shaft (12, 212), wherein the first and the second conical bearing each has:
a bearing cone (14; 114; 214; 314) disposed on the shaft having bearing surfaces (14*a*; 114*a*; 214*a*; 314*a*);
a bearing component (215; 315; 16) having an annular rim (24; 124; 224; 324) that forms a conical counter bearing having bearing surfaces (215*a*; 315*a*; 16*a*, 116*a*); a bearing gap (20; 120; 220; 320) filled with a bearing fluid that separates the bearing surfaces of the bearing cone and the bearing surfaces of the bearing component from one another; a first open end of the bearing gap (20; 120; 220; 320), a first sealing gap (22; 122; 222; 322) that is partially filled with bearing fluid and seals the first open end of the bearing gap, wherein the bearing fluid in the first sealing gap (22; 122; 222; 322) forms a fluid meniscus (23; 123; 223; 323), characterized in that the first sealing gap (22; 122; 222; 322) is bounded by sealing surfaces (14*b*; 144*b*; 214*b*; 314*b*) of the bearing cone (14; 114; 214; 314) and associated sealing surfaces (215*b*; 315*b*; 16*b*; 116*b*) of the bearing component (215; 315; 16), wherein the smallest radius R1 of the sealing surfaces (215*b*; 315*b*; 16*b*; 116*b*) of the bearing component (215; 315; 16) is larger than the largest outer radius R2 of the bearing cone (14; 114; 214; 314) and larger than the greatest distance R3 of the fluid meniscus (23; 123; 223; 323) from the rotational axis (42; 242).

17. A disk drive having a spindle motor according to claim 16, at least one storage disk (54) driven by the spindle motor and means for reading and/or writing data off and to the storage disk (54).

* * * * *